May 14, 1957 L. J. PARCÉ 2,792,442

MULTIPLE CHANNEL CARRIER CURRENT TELEPHONE CABLE

Filed July 15, 1953

United States Patent Office 2,792,442

Patented May 14, 1957

2,792,442

MULTIPLE CHANNEL CARRIER CURRENT TELEPHONE CABLE

Leon Jean Parcé, Sceaux, France, assignor to Societe Anonyme de Telecommunications, Paris, France, a corporation of France Application July 15, 1953, Serial No. 368,127

Claims priority, application France July 30, 1952

1 Claim. (Cl. 174—32)

The present invention relates to a telephone cable for multiple channel carrier current transmission. In order to transmit over as high a number of channels as possible, it is necessary, on the one hand, to operate these cables with constantly higher frequencies, and, on the other hand, to build them with a large number of circuits (pairs or quads), distributed into several cable layers.

It is well known that, to obtain good transmission characteristics in such a cable, it is necessary that the time of propagation $t$ and the characteristic impedance Z of all its circuits be the same. The values of these constants are given by the approximate expressions:

$$t=\sqrt{LC} \text{ and } Z=\sqrt{\frac{L}{C}}$$

where L is the inductance of a circuit per unit length, per kilometer for instance, and C the capacitance of the same circuit per unit length, per kilometer for instance.

It is also known that the inductance of a given circuit decreases with increasing frequency, and that the law of variation of inductance against frequency is not the same according to whether the said circuit is placed in the layer close to the lead sheath of the cable or in a layer remote from said sheath, and that this variation is more rapid for circuits closer to the sheath.

Let $L_2$ and $C_2$ be the inductance and capacitance per unit length of the circuits in an outer layer, and $L_1$ and $C_1$ the inductance and capacitance per unit length of the circuits in an inner layer.

In order that both the constants Z and $t$ be equalized, it is obviously necessary that $L_1=L_2$ and $C_1=C_2$. It will be seen from the foregoing, that it is not possible for the first one of these relationships to be satisfied both at high and low frequencies. However, in practical transmission conditions, it is particularly important that this relationship be satisfied at high frequencies. So $L_1$ must be less than $L_2$ at low frequencies. This requires that, according to a known method, the two wires in a circuit or "pair" in the inner layers be arranged closer to each other than the two wires in a circuit in a peripheral layer and at the same time that the capacitances per unit length $C_1$ and $C_2$ for the considered circuits in different layers must be equal to one another. All other things being equal, the first condition would entail a larger value of the capacitance values for the inner layer circuits than for the outer layer circuits. In order to obtain the required equality of capacitances, it is thus necessary that the dielectric constant $\epsilon_1$ of the insulation of the pairs or quads in the inner layers be smaller than the corresponding dielectric constant $\epsilon_2$ for the pairs or quads in the outer layers. In other words, it is necessary, if the spacing of the wires is assumed to be specified, that it be possible to give to the dielectric constants well defined values. The objects of the present invention are various arrangements making it possible, during the manufacturing of cables, to adjust the various dielectric constants intervening in the capacitances of its circuits, while preserving a given spacing between the wires of the said circuits and the application of these arrangements to a balanced circuit such as a carrier current cable including, for instance, star quads, multiple twin quads or pairs.

The main object of the present invention is a new method of construction for a cable allowing the above-explained requirements to be fulfilled in a simple way.

According to the present invention, there is provided a telephone cable including multiple circuits such as balanced pairs or quads, more particularly adapted to high carrier current operation and comprising arrangements for equalizing the high frequency transmission characteristics of the circuits in the outer layers located near the cable sheath with those of the inner layers located near the center of the cable structure, the equalization being effected by decreasing the effective dielectric constant of the insulation of the circuits in the inner layers with respect to that of the insulation of circuits in the outer layers, characterized in that the individual insulation of conductors in said outer layers includes an insulating yarn with a given diameter wound helically about each of said conductors while the individual insulation of at least part of the conductors in said inner layers includes two insulating yarns twisted together and then helically wound around each of the latter said conductors, the diameter of each of said two twisted yarns being substantially equal to half said given diameter.

Various embodiments of the invention are hereinafter described by way of non-limitative examples, and with references to the appended drawings, wherein.

Figure 1:
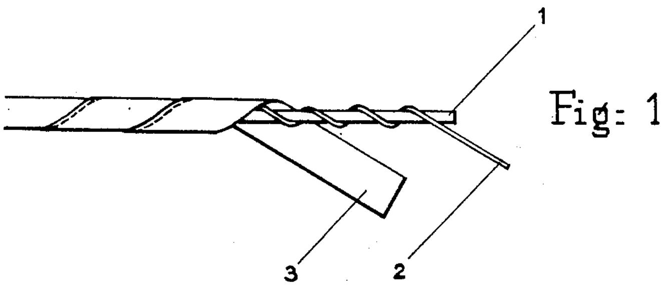
Fig. 1 shows a conductor in a pair or quad of a telephone cable, insulated according to the known art.

In the insulated conductor represented on Fig. 1, 1 is the copper conductor, 2 is an insulating wire with a diameter $d$, laid over 1 with a winding pitch $p$, and 3 is an insulated layer made of an insulating tape with a width L, a thickness $e$ and laid with a pitch P.

Figures 2, 3, 5:
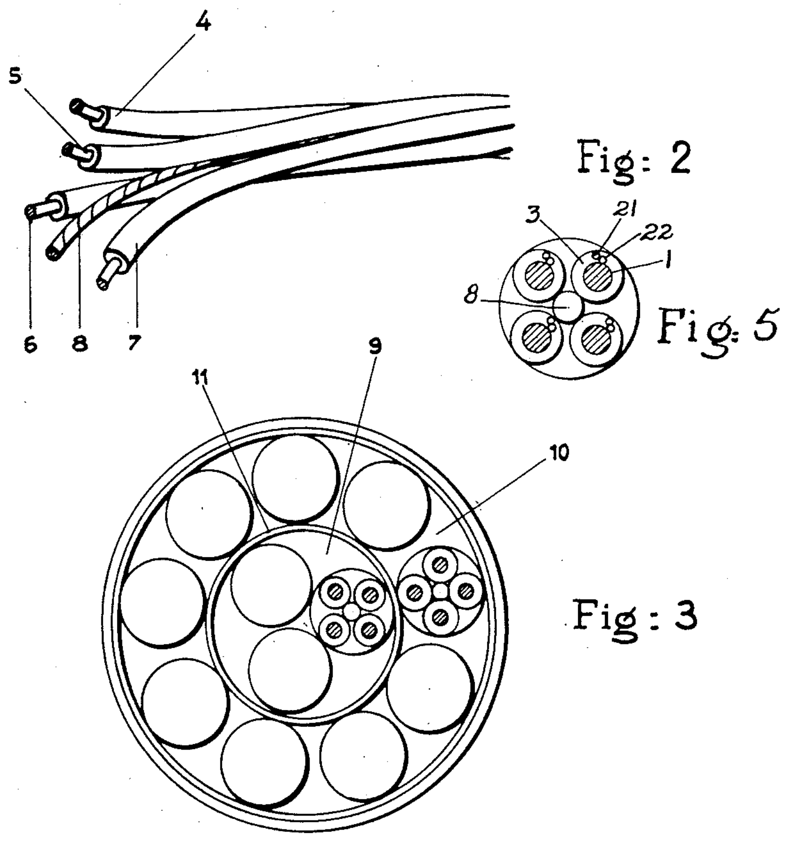
Fig. 2 shows, similarly, the cabling of a quad according to known methods.
Fig. 3 shows a transversal cross-section of a multiple quad telephone cable.
Fig. 5 shows a transversal cross-section of a quad, the conductors of which are insulated according to the invention.
Figure 4:
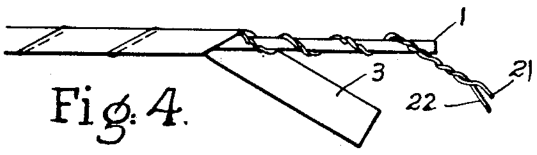
Fig. 4 shows a conductor in a pair or quad of a telephone cable, insulated according to the invention.

Figure 2 shows a star quad formed by means of four insulated conductors 4, 5, 6, 7 as just described. These four conductors are twisted about an insulating yarn core 8 having a diameter D. When it is desired, for a given conductor spacing in such a quad, to decrease the dielectric constant $\epsilon$ of the insulation, the various following methods may be used:

(1) Replacing the insulating yarn 2, with a diameter $d$, by two yarns with a diameter $d/2$ twisted together, which gives an insulated conductor with the same dimensions but with a more aerated dielectric.

(2) Decreasing the thickness $e$ of the insulating tape and increasing correspondingly the diameter of the insulating yarn.

(3) Decreasing the width D of the tape and consequently decreasing the overlapping of the turns of the said tape.

(4) While preserving the width D of the tape, increasing the pitch P of the tape, which consequently decreases the overlapping of the turns of the tape.

(5) Replacing the core 8 with a diameter D by a core formed of two twines with a diameter D/2 twisted together.

The adjustments 2, 3 and 4 should be reversed if, instead of a decrease in $\epsilon$ an increase of this constant is desired. In such a case, an increase in the tape thickness may be obtained by providing two tapes instead of one only.

The above arrangements apply just as well to paper insulated cables as to cables insulated with special insulating materials such as rubber, polyethylene, polystyrene, etc. and may be applied separately or in combination.

The described arrangements may be applied primarily, for equalizing the constants of circuits placed in different layers, but they can also be applied for equalizing the constants of the individual circuits placed in one same layer, if their characteristics are insufficiently equalized, for instance because of different twist pitches or any other reason.

By way of example, there are described hereinafter embodiments of a 12 star-quad cable to which the described arrangements are applied. There is represented in cross-section, on Figure 3, a 12 star-quad cable comprising a layer of three quads designated by 9 and a layer of nine quads designated by 10, the two layers being separated by an insulating taping 11. In order that the inductances of the pairs in the inner and outer layers be equalized at high frequencies, the conductors in the inner quads are closer together than those in the outer quads.

In order to make more obvious the practical advantages derived from the proposed construction method, some results will now be given, certain of which relate to a former cable type and the others to a cable of the new type according to the invention. The specification for the two types of cables and the results obtained are given hereinafter in table form. As already mentioned the parameters which it is desirable to equalize are the characteristic impedance and the time of propagation at high frequencies. In the table the data referring to the various layers of quads are respectively designated, for short, by "inner" or "outer," according to whether they relate to a circuit in an inner or outer layer, the two considered cable types being, generally speaking, of similar construction, except for the particular insulation processes which are the object of the invention.

In the table, the average characteristic impedance of the circuits in the different layers is given at a frequency of 120 kc./s.; the difference between the average times of propagation per kilometer for the two layers expressed in relative values is given for a frequency of 240 kc. s., as the said frequencies are those generally selected for checking the two said characteristics. The actual values of the propagation times are not given, since, for an increased accuracy in the measurements, their differences alone were measured in the test the results of which are summarized in the following table. This table also gives, for reference purposes the inductance values per kilometer measured at low frequencies (at 0.8 kc./s).

There is thus found an important improvement both in the value of the difference in characteristic impedance between circuit pertaining to different layers and in that of the corresponding difference in propagation time when passing from cables of the former type to cables of the new type.

In another type of cable according to the invention and hereinafter described, all quads were twisted with different pitches, the three quads in the inner layer being twisted with shorter pitches than the nine ones in the outer layer. Because of the short pitches used in the inner quads, the mutual equalization of the latter would have been imperfect in the absence of other arrangements. To obviate this drawback the inner layer quad with the shortest pitch was built around a core consisting, instead of a yarn of a given diameter D, of two yarns of diameter D/2 twisted together.

In a general way, a 12 star-quad cable according to the invention may be specified as follows:

| | |
|---|---|
| Insulating yarn: | |
| (inner) | 2 yarns, diameter $0.5d$ |
| (outer) | 1 yarn, diameter $kd$ |
| Insulating paper: | |
| (inner) | 1 tape, thickness $e$. |
| (outer) | 1 tape, thickness $k_1e$. |
| Conductor diameter including insulation: | |
| (inner) | $\phi$. |
| (outer) | $k_2\phi$. |
| Quad core: | |
| (inner) | D. |
| (outer) | $k_3$D. |

This specification corresponds to values comprised, for the coefficients $k$, $k_1$, $k_2$, between 1 and 1.5, and for $k_3$ between 1 and 2.

In practice, when using a twisted double yarn or twine for the insulation of a conductor, the said double twine undergoes a slight crushing under the action of the winding of the insulating tape and other elements placed around said conductor, and this crushing is slightly more pronounced than would be the case if, instead of a twisted double twine, a single twine were used with twice as great a diameter. To preserve the desired dimensional ratios between the elements of the outer layer and those of the inner layer in the cable, it may be necessary to use for the former a single twine with a diameter slightly less than twice that of the elements of the above mentioned double twine, i. e. to select, for the numerical coefficient $k$, a value between 0.9 and 1, for instance. It should be understood that the above mentioned crushing prevails only in a small proportion and does not cause any appreciable increase in the dielectric constant of the insulation of conductors using a twisted double twine.

The examples described are relative to a 12 star-quad with two layers. Within the scope of the present invention, similar arrangements may be applied for equalizing

| | Former cable | New cable |
|---|---|---|
| Insulating yarn: | | |
| (Inner) | 1 yarn, diameter, $d_1$ | 2 yarns diameter $0.5d_2$. |
| (Outer) | 1 yarn, diameter $1.1d_1$ | 1 yarn diameter $d_2$. |
| Insulating paper: | | |
| (Inner) | 1 tape, thickness $e_1$ | 1 tape, thickenss $e_2$. |
| (Outer) | 1 tape, thickness $1.1e_1$ | Do. |
| Quad core: | | |
| (Inner) | 1 wire; diameter $D_1$ | 1 wire; diameter $D_2$. |
| (Outer) | do | Do. |
| Inductance at 0.8 kc./s. μH/km.: | | |
| (Inner) | 892 | 857. |
| (Outer) | 914 | 897. |
| Capacitance at 0.8 kc./s. nF/km. ($1nF=10^{-9}$ Farad): | | |
| (Inner) | 26.72 | 25.63. |
| (Outer) | 25.73 | 25.76. |
| Impedance Z at 120 kc./s. ohms: | | |
| (Inner) | 173.4 | 173.14. |
| (Outer) | 174.8 | 174.35. |
| The relative differences in the time of propagation per kilometer $t$ and in the impedance Z are, between pairs in different layers: | | |
| $\Delta t/t$ in thousandths at 240 kc./s | −30 | 3.1. |
| Δ Z/Z in thousandths at 120 kc./s | 8 | 1.2. |

the constants of the circuits of cables with multiple layers consisting of star quads, multiple twin quads or pairs.

What I claim is:

In a telephone cable; the combination of multiple circuits of the balanced star-quad type adapted for high frequency current transmission and arranged in inner and outer layers, a sheath around said outer layers, the quads in said inner layers having shorter twist pitches than the quads in said outer layers, each of said quads including an insulating core, said insulating cores of the quads in said outer layers being formed of an insulating yarn of a predetermined diameter, said insulating cores of at least part of the quads in said inner layers being formed of an assembly of two insulating yarns twisted together and each having a diameter substantially equal to one-half said predetermined diameter, individual insulation for the conductors of the quads in said outer layers including an insulating yarn with a given diameter wound helically about each of said conductors in the outer layers, and individual insulation for at least part of the conductors of the quads in said inner layers including two insulating yarns twisted together and then helically wound around each of said part of the conductors in said inner layers, the diameter of each of said two twisted together yarns of the individual insulation for said conductors of the inner layers being substantially equal to one-half said given diameter of the yarn forming the individual insulation of said conductors in the outer layers so that the high frequency transmission characteristics of the quads in the inner and outer layers are thereby equalized.

References Cited in the file of this patent

UNITED STATES PATENTS

| | | |
|---|---|---|
| 475,648 | Wesslav | May 24, 1892 |
| 1,987,442 | Harris | Jan. 8, 1935 |
| 2,116,267 | Klimmer | May 3, 1938 |
| 2,116,268 | Klimmer | May 3, 1938 |

FOREIGN PATENTS

| | | |
|---|---|---|
| 788,220 | France | Oct. 7, 1935 |
| 524,674 | Great Britain | Aug. 12, 1940 |